United States Patent [19]

Woodruff

[11] Patent Number: 4,776,790

[45] Date of Patent: * Oct. 11, 1988

[54] REFRACTORY SHIELDS FOR CURVED AND STRAIGHT SUPERHEATER TUBES

[75] Inventor: Roger W. Woodruff, Holden, Mass.

[73] Assignee: Norton Company, Worcester, Mass.

[*] Notice: The portion of the term of this patent subsequent to Jul. 22, 2004 has been disclaimed.

[21] Appl. No.: 93,061

[22] Filed: Sep. 4, 1987

Related U.S. Application Data

[63] Continuation of Ser. No. 944,913, Dec. 22, 1986, abandoned.

[51] Int. Cl.$^4$ .............................................. F27D 1/12
[52] U.S. Cl. .................................... 432/233; 432/234; 138/147; 122/DIG. 13
[58] Field of Search ................ 432/233, 234; 122/511, 122/DIG. 13, 235 C; 138/147, 149

[56] References Cited

U.S. PATENT DOCUMENTS

| | | | |
|---|---|---|---|
| 1,871,508 | 8/1932 | Gardner | 122/DIG. 13 |
| 3,881,864 | 5/1975 | Nicol | 138/147 |
| 3,914,100 | 10/1975 | Guskea | 432/243 |
| 4,049,371 | 9/1977 | Prible | 432/234 |
| 4,071,311 | 1/1978 | Errington | 432/234 |
| 4,095,937 | 6/1978 | Colburn et al. | 432/233 |
| 4,124,068 | 11/1978 | Thompson | 165/134 R |
| 4,304,267 | 12/1981 | Campbell, Jr. | 432/234 |
| 4,682,568 | 7/1987 | Green et al. | 432/234 |

Primary Examiner—Henry C. Yuen
Attorney, Agent, or Firm—Walter Fred

[57] ABSTRACT

Straight and arcuately curved superheater tube shields of refractory material comprising a pair of elongated half shields of identical interchangeable interfitting and interlocking size and shape, each half shield having a semicircular sidewall of corresponding straight or arcuate shape of predetermined radius of curvature extending between opposite ends and to inner diametrically opposite inner sides lying in a central plane and the plane of curvature. A number of mating camming portions with inclined camming surfaces are precisely spaced adjacent each of the inner sides so that one of the half shields may be turned end for end relative to and assembled to the other about a correspondingly shaped superheater tube by a relatively short axial movement and engagement of the inclined camming surfaces whereby the half shields are pulled together to close the joints therebetween and interlocked about the superheater tube. A refractory cement may be applied to attach the half shields to the tubes.

17 Claims, 2 Drawing Sheets

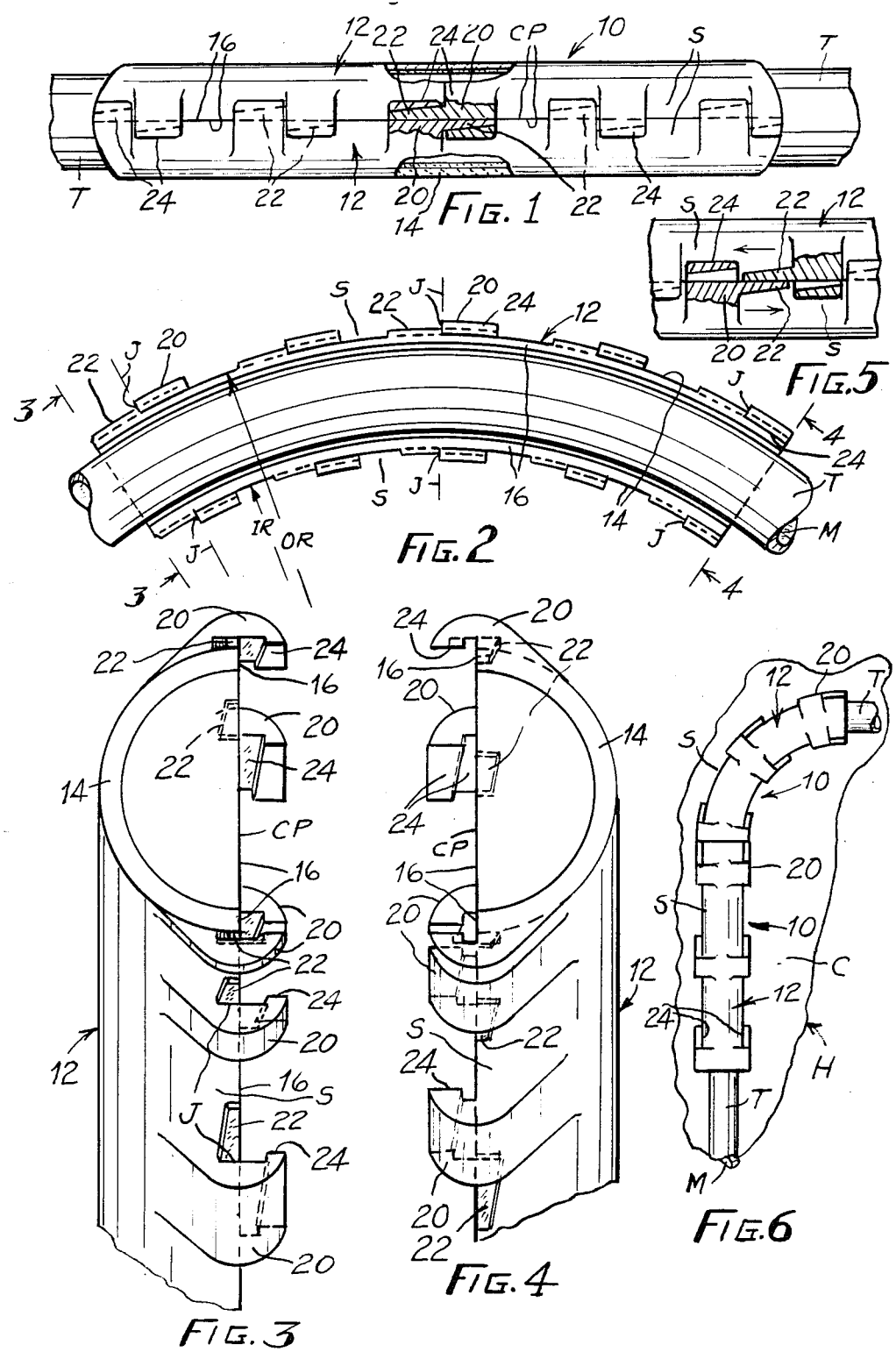

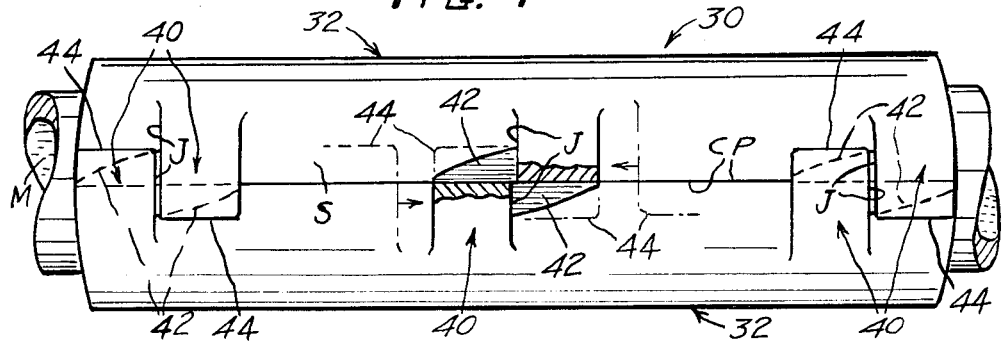
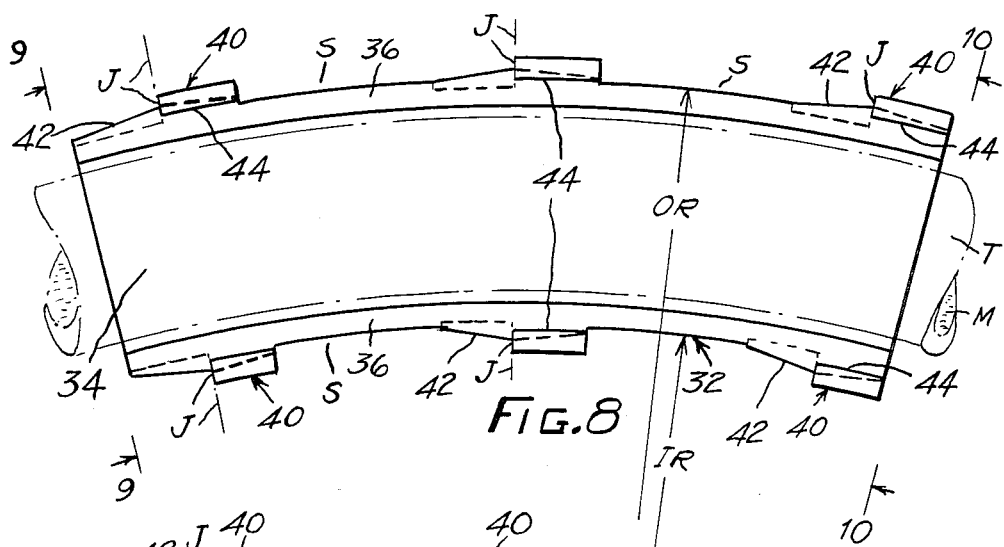
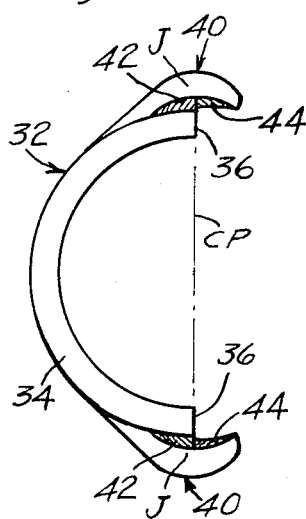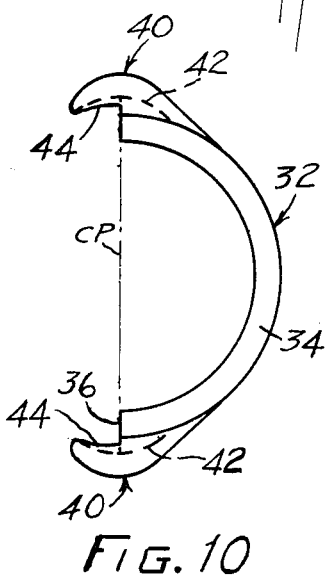

REFRACTORY SHIELDS FOR CURVED AND STRAIGHT SUPERHEATER TUBES

This application is a continuation of application Ser. No. 06/944,913, filed Dec. 22, 1986, now abandoned.

TECHNICAL DISCLOSURE

Straight and arcuately shaped refractory shields each comprising a pair of half shields of identical interchangeable interlocking and reversible size and shape including axially spaced interlocking tapered or inclined mating camming surface portions, extends the life of and protects superheater incinerator tubes from chemical attack by high temperatures, corrosive, errosive and abrasive products of combustion during incineration of refuse and generation of energy therefrom. The terminal portion of this patent subsequent to July 28, 2004 is disclaimed.

BACKGROUND OF THE INVENTION

1. Field of the Invention

The invention relates to high temperature refractory components of specific identical interchangeable reversible interlocking size and shape for protecting straight and arcuately curved portions of boiler superheater tubes from errosive corrosive and abrasive action by the products of combustion during incineration of trash and garbage and generation of energy therefrom.

2. Description of the Prior Art

The prior art discloses many types of fiberous refractory materials applied to and insulating hot air ducts, hot water and steam pipes from heat loss. Boiler, hot air, steam and water tubes have also been made of various high temperature alloys, stainless steel and coated with various materials to prevent corrosion, errosion, abrasion and chemical attack by the products of combustion.

However, the above mentioned prior art methods and material have not been entirely satisfactory and short lived in superheated incinerators in wherein municipal refuse, trash and garbage are simultaneously burned to heat and produce superheated steam or other fluids in the tubes for driving turbine driven generators and producing energy therewith.

U.S. Pat. No. 3,914,100 also describes a ceramic pipe covering comprised of a pair of half sections each of different non-interchangeable-interfitting shape held together by additional fasteners.

Another refractory shield comprised of a pair of identical half shields is also disclosed in a co-pending application Ser. No. 06/871,004 filed June 5, 1986 and assigned to the same assignee of record in the instant invention which is an improvement thereover.

The instant invention provides protection and shields for both straight and arcuately curved portions of the superheater tubes from direct attack by harmful products of combustion without loss of heat transfer to the tubes. The heat conducting refractory shields are easily applied without additional fasteners or extending a half section the entire axial length of the other half section and hence are assembled by placing them side by side and shifting them a relatively short axial distance whereby a mating interfitting tapered or inclined camming surface portions slidingly engage one another to cam and pull the half sections together, and tightly close the joint therebetween.

SUMMARY OF THE INVENTION

Straight and arcuately shaped superheater tube refractory shields are each comprised of a pair of interchangeable, interfitting and interlocking half sections or shields of identical size and semi-circular shape made of refractory material such as nitride bonded silicon carbide, alumina, zirconia, magnesia, chromia and mixtures thereof. Each of the half sections of either elongated straight or arcuate shape has a central plane to which the opposite flat inner sides of a semi-circular wall extend and form a pair of opposing joints between a pair of the half sections assembled about a section of a boiler tube of corresponding shape, with or without refractory mortar cement by axial sliding engagement of a plurality of precisely axially or longitudinally spaced interfitting tapered or inclined mating camming portions of relatively short axial or arcuate length on each opposite side of each half section and thereby close the joints therebetween and lock the half sections together. One or more of the arcuate or straight shields may be required and assembled about each of the tubes in order to shield the entire length of each of the heated tubes of a superheater, boiler, incinerator, or heat exchanger.

BRIEF DESCRIPTION OF THE DRAWINGS

FIG. 1 is a plan view, partly in section showing a section of a superheater tube surrounded by and protected by an assembled pair of identical refractory half shields of the invention;

FIG. 2 is a side view of an arcuately shaped half shield of the invention mounted on a half section of a curved superheater tube with a like radius of curvature in a single central plane;

FIG. 3 is an end view of the half shield taken at line 3—3 of FIG. 2;

FIG. 4 is an opposite end view of the half shield taken at line 4—4 of FIG. 2 and which you can see when turned end-for-end also provides the other identical half shield or section of the refractory shield;

FIG. 5 is a partial plan view partly in section showing the axial alignment of the interlocking tapered or inclined camming surface portions of each of the half shields prior to being axially displaced into sliding locking camming engagement relative to each other to the final position shown in FIG. 1; and FIG. 6 is a view showing straight and adjoining curved sections of a superheater tube surrounded by and protected by correspondingly straight and arcuately curved refractory shields comprised of identical half shields with a lesser number of axially spaced tapered or inclined camming surface portions holding the half shields together.

FIG. 7 is a plan view of another embodiment of the invention comprising a pair of identical half shields with different gradually inclined and arcuately curved mating camming surface portions on each of the pair of half shields.

FIG. 8 is a side view of an arcuately shaped half shield with the arcuately inclined mating camming surface portions thereon;

FIG. 9 is an end view taken on line 9—9 of FIG. 8, and,

FIG. 10 is an opposite end view of the half shield taken on line 10—10 of FIG. 8.

DESCRIPTION OF THE PREFERRED EMBODIMENT(S)

In the drawings there is shown both straight and curved or bent portions of one of many elongated super heated tubes T that extend longitudinally or vertically in the combustion chamber C of a superheater H such as a high temperature municipal trash and garbage incinerator. In addition to disposing of the trash and garbage the incinerator is utilized to burn and produce therefrom a source of energy such as steam to drive a turbine driven electrical generator or to merely heat a fluid used for other purposes.

During operation the incinerator burns the trash and garbage and high temperatures and produces corrosive, errosive, and abrasive products of combustion which heat and attack the metallic tubes T containing a fluid medium M such as gases, air, steam, liquids, or water superheated to produce steam or hot gases of sufficient temperature and pressure to drive a turbine and generator.

To prevent direct and chemical attack of the tubes by the products of combustion and yet allow the tubes to be super heated, the instant invention provides one or more heat conducting high temperature refractory shields 10 assembled about, surrounding, and protecting one or more straight and curved sections of each longitudinal tube T containing the fluid medium M.

Each of the refractory shields 10, whether of generally straight or arcuate cylindrical shape, comprises a pair of elongated half shields or sections 12 each of identical, interchangeable, interfitting, and interlocking size and generally semi-circular shape made of a suitable refractory composition containing a refractory material selected from a group consisting of silicon carbide, nitride bonded silicon carbide, alumina, zirconia, magnesia chromia, an mixtures thereof.

Each refractory half shield 12 comprises an elongated sidewall portion 14 of predetermined axial or arcuate length between opposite ends, thickness and arcuate or semi-circular shape extending circumferentially about one half of the tube T to and between opposite elongated spaced inner sides 16 situated in a central plane CP passing through opposing joints of the shield 10 about tube T.

In the case of an arcuately shaped half shield 12 the central plane CP is also the plane of curvature and passes through the center of both the shorter inner radius IR and longer outer radius OR of curvature of the diametrically opposite shorter lower and longer upper arcuate inner sides 16 of the semicircular sidewall 14. Axially or circumferentially spaced and radially aligned along the sidewall 14 adjacent each of the opposite inner sides 16 of the sidewall 14 of each half shield 12 are a plurality of integral mating camming portions 20. Each of the camming portions 20 comprises a tapered or inclined cam 22 situated on one side of the center or junction J and the elongated central or diametral plane CP and an overhanging tapered or inclined mating cam receiving grooved portion 24 projecting from the sidewall 14 and situated on the opposite side of the central plane CP and junction J. Both the cam 22 and the cam receiving grooved portion 24 have mating inclined or tapered shoulders and adjacent surfaces that are parallel to each other and taper toward the central plane and in opposite directions from the adjacent wider portions at the junction J thereof to the narrower opposite end portions of the cams 22 and cam receiving grooves 24. The mating identical tapered shoulders may be up to $\frac{1}{8}''$ (3.2 mm) in height or depth and inclined from 1° to 15° relative to the central plane CP and inner sides 16.

The spacing of the mating camming portions 20 along the central plane of each of the identical half shields is such that the cams 22 and the cam receiving groove portions 24 will matingly engage those of the other identical half shield turned end for end. There, is at least a pair of raised or shouldered cams 22 with the narrow or small ends thereof situated at or spaced a predetermined fixed distance from one end of the half shield and a pair of overhanging grooved or recessed cam portions 24 with the small ends of the cam receiving grooves situated or spaced the same prefixed distance from the opposite end of the half shield as are the cams 22 from the other end of the half shield 12. Also, the axial or circumferential spaces S between adjacent pairs of camming portions 20, that is the distance between the cams 22 and the overhanging grooved portions 24 must be greater than the width of and allow the overhanging grooved portions 24 to enter, and overlap side wall portions of each of the half shields 12 prior to being shifted axially or longitudinally into mating interlocking camming engagement with each other about a heat tube T.

Preferably there are at least three or more spaced pairs of identical mating camming portions 20, each about $1\frac{1}{2}''$ (3.8 cm) long, on each of the half shields 12 of the shield 10. A pair at each of its end portions and one or more pairs in the center portion of the half shield. The axial or longitudinal arcuate distance from each opposite end of the half shield to the center or junction J between the raised cams 22 and grooved cam portions 24 of each camming portion 20 are identical. The center and junction J of each camming portion 20 being situated in a radial plane at the adjoining wider end portions of the cams 22 and the overhanging grooved cam portions 24 which are relatively short and of substantially the same axial or longitudinal arcuate length of about $\frac{1}{2}''$ to $\frac{3}{4}''$ (13 to 19 mm). Hence, by turning or reversing one of the pair of identical half shields 12 longitudinally end for end 180° relative to the other, the half shields 12 may be placed and assembled together on opposite sides of a corresponding straight or curved portion of a tube T coated with a refractory mortar or cement. The overhanging grooved cam portions 24 which have their lowest point or edges situated a greater radial distance from the center of and above that of the sidewall 14, are first aligned as shown in FIG. 5 with the spaces S and pushed laterally together until the inner sides 16 meet. They are then shifted axially relative to one another to matingly engage the tapered or inclined mating cams 22 and the grooved camming portions 24 which pull the half shields 12 together, and thus close the joints between them and lock one to the other to provide an assembled protective shield 10.

Another embodiment of the invention is shown in FIGS. 7–10 wherein a straight or arcuately curved high temperature refractory shield 30 similar in most respects to the shield 10, surrounds and protects correspondingly shaped portions of a superheater tube T through which a fluid medium M is circulated and heated by the products of combustion.

Each of the shields 30 comprises a pair of either straight or arcuately curved elongated half shields or sections 32 each of identical interchangeable, interfitting, interlocking size and semi-circular shape made of the same refractory composition as recited above in respect to the half shield 12.

Each refractory half shield 32 comprises an elongated straight or arcuately curved side wall portion 34 of predetermined longitudinal axial or arcuate length between its opposite ends, thickness, and arcuate or semi-circular shape extending circumferentially about one half the diameter of the tube T to and between opposite elongated spaced inner sides 36 situated in a central plane CP passing through opposing joints of the shield 30 about tube T. In an arcuately shaped elongated half shield 32, the central plane CP is also in the plane of curvature and passes through the centers of the smaller or shorter inner radius IR and larger or longer outer radius OR of curvature of the respective diametrically opposite shorter lower and longer upper sides 36 of the semi-circular sidewall 34.

A plurality of integral mating camming portions 40 are axially or circumferentially spaced and radially aligned in pairs along and adjacent each of the diametrically opposite inner sides 36 of the sidewall 34.

Each of the interlocking camming portions 40 of from 1" to 1½" (2.5-3.8 cm) long comprises a junction J lying in a radial plane passing between an inclined arcuately shaped or curved cam 42 situated on one side of the junction J and central plane CP and an overhanging inclined arcuately shaped or curved mating cam receiving grooved portion 44 of substantially equal width or length of about ½" to ¾" (13 to 19 mm) situated on the opposite side of junction J and plane CP.

Both the arcuately curved raised cams 42 and receiving recessed or grooved cams 44 have arcuately curved mating cam surfaces that extend upwardly to inclined inner edges situated at an identical incline of from 1° to 15° in opposite directions from lower ends at opposite sides of each of the mating camming portions 40 to higher raised ends situated at the center or junction J. The mating inclined arcuate surfaces of the cams 42 and mating recessed or grooved cams 44 curve upwardly from lower points or edges thereof situated substantially at the level of the outer surface of the sidewall 34 at a radius less than and from ⅓ to ⅔ the outside radius of the sidewall 32 to high points of the inclined edges situated at junction J up to ⅛" (3.2 mm) above and aligned with the inner sides 36 and the central plane CP. However, the lower edges of the over hanging grooved cam portions 44 are maintained slightly above the level and of greater radius than the outer radius of the side wall 34 so that they can enter the spaces S between the camming portions 40 of the other half shield 32 prior to longitudinal or axial camming engagement and assembly.

Like the half shields 12, the half shields 32 have at least two but preferably three or more pairs of camming portions 40 spaced a predetermined longitudinal identical distance from each of the opposite ends along and adjacent the central plane and inner sides 36 of the elongated side wall 34. FIGS. 7 and 8 show half shield 32 with three camming portions 40. There is one at each opposite end portion and in the center spaced a greater distance S from one another than the axial width or length of the overhanging grooved cam portions 44 which must enter the spaces S. The spacing of camming portion 40 from each opposite end of the half shield 32 to the center or junction J thereof must be identical to enable one of these shields to be reversible and turned end for end 180° and assembled to the other.

To assemble a pair of identical half shields 32 about a tube T, either the tube T or inside of each half shield 32 may or may not be coated with a thin layer of refractory mortar cement. One half shield is then placed laterally over one half of the tube T of corresponding shape and the other turned lengthwise end for end 180° with the cam portions 42 opposite one another and the overhanging grooved cam portions 44 aligned with the space S of each of the half shields 32. The half shields are then forced laterally together until their inner sides 36 meet to form a joint whereupon the pair of half shields 32 are axially or longitudinally displaced a short distance relative to one another causing mating camming and locking engagement between the identical cams 42 and the overhanging grooved mating cam portions 44. Thus, the inter camming action between the mating inclined curved camming surfaces of the cams 42 and grooved cam portions 44 pull and lock half shields 32 together and thereby close the joints. The process of assembly is repeated until the entire exposed outer surface of each of the straigt and curved portions of each of the superheater tubes T are covered.

After a few hours the refractory mortar cement will harden to space and hold the shields 10 and 30 in place and upon firing of the superheater it will become a harder bonded refractory material and conductor of heat to the tubes T.

Refractory shields made of nitride bonded silicon carbide material made and sold by Norton Company, Worcester, Mass. under its registered trademark "CRYSTON" have been tested for a few months at an average temperature of 1800° F. and show no signs of errosion or wear. Thus, the shields are expected to last from 3 to 6 years and to protect and extend the life of incinerator tubes at least three times their average life of 1 to 1½ years for an unprotected tube exposed to the same products of combustion. Furthermore, replacement of the refractory shields every 3 years is found to be less costly and to take less time than replacing the tubes requiring a greater amount of downtime and loss of energy generating capacity and loss of revenue therefrom.

Typical shields for corresonding straight or arcuately bent portions of a tube T about 2½" (6.4 cm) outside diameter and a radius of curvature of from 1' to 3' (0.3 to 0.9 m) comprises pair of identical half shields each about 18" (45.8 cm) long between opposite flat ends of the semi-circular sidewall about ¼" (6.5 mm) thick, with an inside radius of 1⅜" (3.5 cm). The overall maximum diametrical dimension of an assembled shield being about 4-3/16" (11 cm) over the overhanging grooved camming portions measured at the central plane CP. The spaced mating camming portions 20 and 40 are about 1½" (3.8 cm) in axial or arcuate length with the cams 22 and 42 and the grooved cam portion 24 and 44 of equal length or width of about ¾" (19 mm) from the junction J.

Each half section or shield including the mating camming portions may be molded to precise size and shape by various conventionally known techniques and fired in a kiln at known temperatures and periods of time. If necessary the mating camming surfaces may be further machined or grooved for mating engagement.

The superheater tube shields of the invention are preferably nitride bonded silicon carbide refractory material made of the following mixture of ingredients:
30% by weight of 30-90 mesh green silicon carbide 17% by weight of 100 mesh and finer green silicon carbide 35% by weight of 3 microns green silicon carbide 18% by weight of 200 and finer mesh silicon metal powder The above mixture of ingredients is mixed with approximately 12% by weight of water and 0.75% by weight of sodium silicate deflocculant solution until it attains a viscosity suitable for slip casting in a porous mold of the desired shape. A mold is filled with the mixture or slip, dried and removed from the mold. The green slip cast shape is then further dried and fired at 1450° C. in a kiln with a nitrogen atmosphere until cured. The process of slip casting the above mixture is with slight variations substantially the same as that taught in U.S. Pat. No. 2,964,823 incorporated hereby by reference.

A preferred refractory mortar cement composition for attaching the half shields comprises a mixture of 85% by weight of 10 mesh size and finer size particles of green silicon carbide and 15% by weight of calcium aluminate mixed together and with 10-15% water to form a plastic mortar. Upon firing during operation of the incinerator the mortar becomes a bonded silicon carbide layer between the shield and the superheater tube.

I claim:

1. A refractory shield for protecting correspondingly shaped sections of straight and curved superheater tubes against attack by the products of combustion comprising:

a pair of elongated refractory half shields of identical interchangeable, interfitting, interlocking size and shape adapted when one half shield is turned longitudinally end for end relative to the other half shield to fit laterally together, be shifted longitudinally a short distance relative to one another, cammed and interlocked together to close diametrically opposite joints between the half shields and thereby cover and protect a section of a superheater tube of corresponding shape, each half shield having an elongated sidewall portion of predetermined thickness and longitudinal length between opposite ends thereof, extending circumferentially between and to diametrically opposite inner sides lying in a central plane;

a plurality of identical mating camming portions spaced longitudinally between the opposite ends of and along the sidewall adjacent each of the diametrically opposite inner sides of the sidewall and each camming portion having a central junction lying in a radial plane at its center and located substantially the same predetermined distance from an adjacent one of the opposite ends as is the central junction of another camming portion situated adjacent the same one of the diametrical opposite inner sides is from the other adjacent one of the opposite ends, a raised inclined cam of predetermined identical size, shape, and inclination extending from a portion of the sidewall and the diametrically opposite inner side on one and the same side of the central junction and the central plane of the half shield, and each raised cam having and inclined from a small end portion at one side of the camming portion to a larger end portion at the central junction, and, an overhanging recessed inclined cam receiving portion of predetermined identical mating size, shape and inclination projecting from a portion of the sidewall portion and the diametrically opposite inner side and situated on the opposite and same side of the central junction and the central plane, and each recessed inclined cam receiving portion having and inclined opposite to the raised cam from a small end portion at an opposite side of the camming portion to a larger end portion at the central junction, adapted to laterally enter a space of greater width adjacent each of the camming portions of the other half shield and moved longitudinally a relatively small distance to matingly engage the raised inclined cams of the other identical half shield turned end for end relative to the other of the pair of identical half shields whereby the overhanging recessed inclined cam receiving portions and the raised inclined cams of each of the pair of identical half shields slidably engage one another and simultaneously pull and lock the pair of half shields together and close the joints therebetween.

2. A refractory shield according to claim 1 wherein each of the identical half shields has a semi-circular sidewall portion.

3. A refractory shield according to claim 1 further comprising:

a layer of refractory cement on inner surfaces of each half shield for attachment to a section of a superheater tube and containing a refractory material selected from a group consisting of silicon carbide, alumina, zirconia, magnesia, chromia, and mixtures thereof.

4. A refractory shield according to claim 1 wherein each of the half shields is made of a refractory composition containing a refractory material selected from a group consisting of silicon carbide, alumina, zirconia, magnesia, chromia, and mixtures thereof.

5. A refractory shield according to claim 3 wherein the layer of refractory cement contains calcium aluminate bond material.

6. A refractory shield according to claim 1 wherein the half shields are made of nitride bonded silicon carbide.

7. A refractory shield according to claim 1 wherein the raised inclined cams and overhanging recessed inclined cam receiving portions each have mating inclined shoulder surfaces of predetermined height above the sidewall, inclined relative to the diametrically opposite inner sides and the central plane of the sidewall from opposite smaller ends to larger ends of the raised inclined cams and overhanging recessed inclined cam receiving portions situated at the central junction and the radial plane.

8. A refractory shield according to claim 1 wherein the raised inclined cams and the overhanging recessed inclined cam receiving portions have mating inclined camming surfaces extending upwardly at the same inclination from opposite sides of the camming portions to a higher point located at the central junction and the radial plane therebetween.

9. A refractory shield according to claim 8 wherein the mating inclined camming surfaces of both the raised inclined cams and the overhanging recessed inclined cam receiving portions are arcuately curved downwardly at a predetermined same radius and in opposite directions away from a higher inclined edge of the inner sides of the sidewall lying in the central plane.

10. A refractory shield according to claim 1 wherein each of the pair of identical half shields is of arcuate shape and comprises:
an elongated sidewall extending arcuately between the opposite ends and circumferentially to diametrically opposite arcuately curved upper and lower inner sides each of a different predetermined radius of curvature and arcuate length lying in the central plane and plane of curvature.

11. A refractory shield according to claim 10 wherein the mating camming portions are spaced longitudinally between the opposite ends in radially aligned pairs along and adjacent each of the diametrically opposite arcuately curved inner sides of the elongated and arcuately extending sidewall.

12. A refractory shield according to claim 11 wherein each of the raised inclined cams and overhanging recessed inclined cam receiving portions extend from opposite sides of each camming portion to a central junction thereof situated in a radial plane passing through a center of the radius of curvature.

13. A refractory shield according to claim 12 wherein the mating camming portions including the raised and overhanging recessed cam receiving portions along each of the diametrically opposite arcuately curved inner sides are of the same arcuate length and radius of curvature and the mating camming portions along and adjacent one of the diametrically opposite arcuately curved inner sides have a greater outer radius of curvature and arcuate length than the camming portions spaced along adjacent the other diametrically opposite arcuately curved inner side.

14. A refractory shield according to claim 13 wherein the raised inclined cams and overhanging recessed inclined cam receiving portions of each of the identical mating camming portions are of equal arcuate length from the central junction and the radial plane therebetween and the central junction of each of the camming portions spaced along each of the diametrically opposite arcuately curved inner sides and situated adjacent and closer to each of the opposite ends are located the same arcuate distance from the adjacent opposite ends of the elongated sidewall.

15. A refractory shield according to claim 1 wherein each of the pair of identical half shields is of straight elongated shape and comprises:
an elongated straight sidewall extending longitudinally between and to opposite ends thereof and circumferentially to diametrically opposite straight inner sides of the same longitudinal length and lying in the central plane.

16. A refractory shield according to claim 15 wherein the mating camming portions are of the same size and shape, spaced longitudinally between the opposite ends in radially aligned pairs along and adjacent each of the diametrically opposite straight inner sides of the straight elongated sidewall portion of each half shield.

17. A refractory shield according to claim 16 wherein the raised inclined cams and overhanging recessed inclined cam receiving portion of each of the identical mating camming portions are of equal width from the central junction and the radial plane therebetween and the central junction of each of the camming portions along and adjacent each of the diametrically opposite straight inner sides and situated adjacent to and closer to each of the opposite ends are located the same axial distance from the adjacent opposite ends of the straight elongated sidewall portion.

* * * * *